United States Patent
Mallada et al.

(10) Patent No.: US 10,042,384 B2
(45) Date of Patent: Aug. 7, 2018

(54) SYSTEM AND METHODS FOR COMPUTER CLOCK SYNCHRONIZATION WITHOUT FREQUENCY ERROR ESTIMATION

(71) Applicant: Cornell University, Ithaca, NY (US)

(72) Inventors: Enrique Mallada, Pasadena, CA (US); Ao Tang, Ithaca, NY (US)

(73) Assignee: Cornell University, Ithaca, NY (US)

( * ) Notice: Subject to any disclaimer, the term of this patent is extended or adjusted under 35 U.S.C. 154(b) by 130 days.

(21) Appl. No.: 15/021,782

(22) PCT Filed: Sep. 16, 2014

(86) PCT No.: PCT/US2014/055907
§ 371 (c)(1),
(2) Date: Mar. 14, 2016

(87) PCT Pub. No.: WO2015/039119
PCT Pub. Date: Mar. 19, 2015

(65) Prior Publication Data
US 2016/0231770 A1  Aug. 11, 2016

Related U.S. Application Data

(60) Provisional application No. 61/878,105, filed on Sep. 16, 2013.

(51) Int. Cl.
*G06F 1/12* (2006.01)
*H04J 3/06* (2006.01)
*G06F 1/10* (2006.01)
*H04L 7/00* (2006.01)
*H04L 29/06* (2006.01)

(52) U.S. Cl.
CPC .............. *G06F 1/12* (2013.01); *G06F 1/10* (2013.01); *H04J 3/0667* (2013.01); *H04L 7/0012* (2013.01); *H04L 7/0016* (2013.01); *H04L 69/16* (2013.01)

(58) Field of Classification Search
CPC ................................ G06F 1/12; H04J 3/0667
See application file for complete search history.

(56) References Cited

U.S. PATENT DOCUMENTS

| | | | |
|---|---|---|---|
| 2012/0159001 A1 | 6/2012 | Liu et al. | |
| 2012/0170597 A1 | 7/2012 | Stanton et al. | |
| 2013/0054839 A1 | 2/2013 | Rodriguez et al. | |
| 2013/0322426 A1* | 12/2013 | Niranjayan | H04W 56/0055 370/350 |

OTHER PUBLICATIONS

Mallada et al. Skewless Network Clock Synchronization, IEEE, Aug. 2013.

* cited by examiner

*Primary Examiner* — Albert Wang
(74) *Attorney, Agent, or Firm* — Valauskas Corder LLC (57) ABSTRACT

A clock synchronization system and methods including an algorithm, or protocol, that synchronizes to any source of time without the need of estimating frequency errors and only performing frequency adaptions. Specifically, a clock synchronization protocol synchronizes networked nodes without explicit estimation of the clock skews and steep corrections on the time. The algorithm is guaranteed to converge even in the presence of timing loops which allow different clients to share timing information and even collectively outperform individual clients when the time source has large jitter.

14 Claims, 11 Drawing Sheets

SYSTEM AND METHODS FOR COMPUTER CLOCK SYNCHRONIZATION WITHOUT FREQUENCY ERROR ESTIMATION

CROSS-REFERENCE TO RELATED APPLICATION

This application claims the benefit of U.S. Provisional Application No. 61/878,105 filed Sep. 16, 2013.

STATEMENT CONCERNING FEDERALLY SPONSORED RESEARCH

The invention was made with government support under Grant No. CCF-0835706 awarded by the National Science Foundation (NSF). The government has certain rights in the invention.

FIELD OF THE INVENTION

The invention relates generally to multiprocessor computer systems and, more particularly, to a multinode multiprocessor computer system with distributed local clocks.

BACKGROUND OF THE INVENTION

Multinode multiprocessor computer systems typically have multiple processors in each node. The nodes are connected together through a system interconnect to facilitate communication between the processors. In some applications, the nodes may be divided into physical partitions, or domains, wherein each physical partition is capable of operating as a separate computer. Typically, the processors on the nodes need access to a system clock to determine the time that events start, stop, timeout, etc.

Keeping consistent time among different nodes in a network is a fundamental requirement of many distributed applications. The internal clocks of nodes are usually not accurate enough and tend to drift apart from each other over time, generating inconsistent time values. Network clock synchronization allows these devices to correct their clocks to match a global reference of time, such as the Universal Coordinated Time (UTC), by performing time measurements through the network. For example, for the Internet, network clock synchronization has been an important subject of research and several different protocols have been proposed. However, these protocols are used for various legacy and emerging applications with diverse precision requirements such as banking transactions, communications, traffic measurement and security protection.

In particular, in modern wireless cellular networks, time-sharing protocols need an accuracy of several microseconds to guarantee the efficient use of channel capacity. Another example is the recently announced Google Spanner, a globally distributed database, which depends on globally-synchronized clocks within at most several milliseconds drifts.

As another example, as part of a Transmission Control Protocol/Internet Protocol (TCP/IP) protocol, processors must measure a roundtrip time for TCP/IP packets to travel between source and destination computers. Yet another example is the running of a debugging application that places timestamps on events and stores the timestamps in a log file. In such debugging applications, the exact time and sequence of events is important. Because different processors on different nodes store timestamps in the log file, it is important that all the processors have access to a common time base. If the processors access different clocks and those clocks are not synchronized, the timestamps would be meaningless and events would appear erroneously out of order.

Clock synchronization on computer networks has been subject of study for more than 20 years. Standards for IP networks are the Network Time Protocol (NTP), Precision Time Protocol (PTP), and Coordinated Cluster Time (CCT) protocol.

NTP is one of the oldest Internet protocols in use and is intended to synchronize all participating computers to within a few milliseconds of Coordinated Universal Time (UTC). NTP uses a modified version of Marzullo's algorithm to select accurate time servers and is designed to mitigate the effects of variable network latency. NTP is a low-cost, purely software based solution whose accuracy mostly ranges from hundreds of microseconds to several milliseconds, which is often not sufficient.

On the other hand, IEEE 1588 PTP gives superior performance by achieving sub-microsecond or even nanosecond accuracy. However, it is relatively expensive as it requires special hardware support to achieve those accuracy levels and may not be fully compatible with legacy cluster systems.

More recently, new synchronization protocols have been proposed with the objective of balancing between accuracy and cost such as the CCT protocol. The CCT protocol is able to provide better performance than NTP without additional hardware. Its success is based on a skew estimation mechanism that progressively adapts the clock frequency without offset corrections. Another alternative is the Robust Absolute and Difference Clock Project (RADclock) protocol which decouples skew compensation from offset corrections by decomposing the clock into a high performance difference clock for measuring time differences and a less precise absolute clock that provides UTC time.

There are two major difficulties that make the network clock synchronization problem challenging. First, the frequency of hardware clocks is sensitive to temperature and is constantly varying. Second, the latency introduced by the operating system (OS) and network congestion delay results in errors in the time measurements. Thus, most protocols introduce different ways of estimating the frequency mismatch—referred to as "skew" and measuring the time difference—referred to as "offset". This leads to extensive literature on skew estimation which suggests that explicit skew estimation is necessary for clock synchronization. However, focusing on skew estimation may be unnecessary.

An objective of the invention, therefore, is to provide a clock synchronization system and methods that is able to synchronize to any source of time without affecting the operation of running clocks on other nodes.

SUMMARY OF THE INVENTION

The invention is a system and methods for network clock synchronization including a simple algorithm—also referred to as protocol—that is able to compensate the clock skew without any explicit estimation of it. The algorithm only uses current offset information and an exponential average of the past offsets. Thus, it neither needs to store long offset history nor perform expensive computations on them.

The invention solves problems present with CCT and RADclock protocols by achieving microsecond level accuracy without requiring any special hardware. The algorithm according to the invention functions without the need of estimating frequency errors and only performing frequency adaptations. Specifically, the invention does not explicitly estimate the skew which makes the implementation simpler and more robust to jitter than CCT, and does not introduce offset corrections, which avoids the need of a secondary clock as in RADclock.

The algorithm includes a convergence property and includes one or more conditions for synchronization. The parameter values that guarantee synchronization depend on the network topology, but there exists a subset of them that is independent of topology and therefore of great practical interest.

In addition, although a common practice in the clock synchronization community is to avoid timing loops in the network due to the introduction of instability, the invention guarantees convergence with a set of proper parameters even in the presence of loops. Furthermore, timing loops among clients can actually help reduce the jitter of the synchronization error and is therefore desirable.

The invention and its attributes and advantages may be further understood and appreciated with reference to the detailed description below of contemplated embodiments, taken in conjunction with the accompanying drawing.

DESCRIPTION OF THE DRAWING

The preferred embodiments of the invention will be described in conjunction with the appended drawings provided to illustrate and not to the limit the invention, where like designations denote like elements, and in which:

FIG. 8(b) illustrates a configuration topology with two clients connected to a server and mutually connected on convergence according to one embodiment of the invention.

DETAILED DESCRIPTION OF THE INVENTION

Providing some background on how clocks are actually implemented in computers and how different protocols discipline them is considered. Most computer architectures keep their own estimate of time using a counter that is periodically increased by either hardware or kernel interrupt service routines (ISRs). On Linux platforms for instance, there are usually several different clock devices that can be selected as the clock source by changing the clocksource kernel parameter. One particular counter that has recently been used by several clock synchronization protocols is the Time Stamp Counter (TSC) that counts the number of CPU cycles since the last restart of the system. For example, using IBM BladeCenter LS21 servers or nodes, the TSC is a 64-bit counter that increments every $\delta^o=0.406$ ns since the CPU nominal frequency $f^o=1/\delta^o=2399.711$ MHz. Although IBM BladeCenter LS21 servers are used in certain embodiments, any server or node is contemplated to run the skewless algorithm. Using this counter, each server builds its own estimate $x_i(t)$ of the global time reference, UTC, denoted here by t. For example, if $c_i(t)$ denotes the counter's value of computer i at time t, then $x_i(t)$ can be computed using:

$$x_i(t) = \delta^o c_i(t) + x_i^o \qquad \text{Equation (1)}$$

where $x^o$ is the estimate of the time when the server was turned on $t_0$.

Thus, synchronizing computer clocks implies correcting $x_i(t)$ in order to match t, i.e. enforcing $x_i(t)=t$. There are two difficulties on this estimation process. Firstly, the initial time $t_0$ in which the counter starts is unknown. Secondly, the counter updating period $\delta_i (\delta_i \approx \delta^o)$ is usually unknown with enough precision and therefore presents a skew $$r_i = \frac{x_i(t) - x_i(t_0)}{t - t_0} = \frac{\overline{\delta^0}}{\overline{\delta_i}}.$$

Figure 1A:
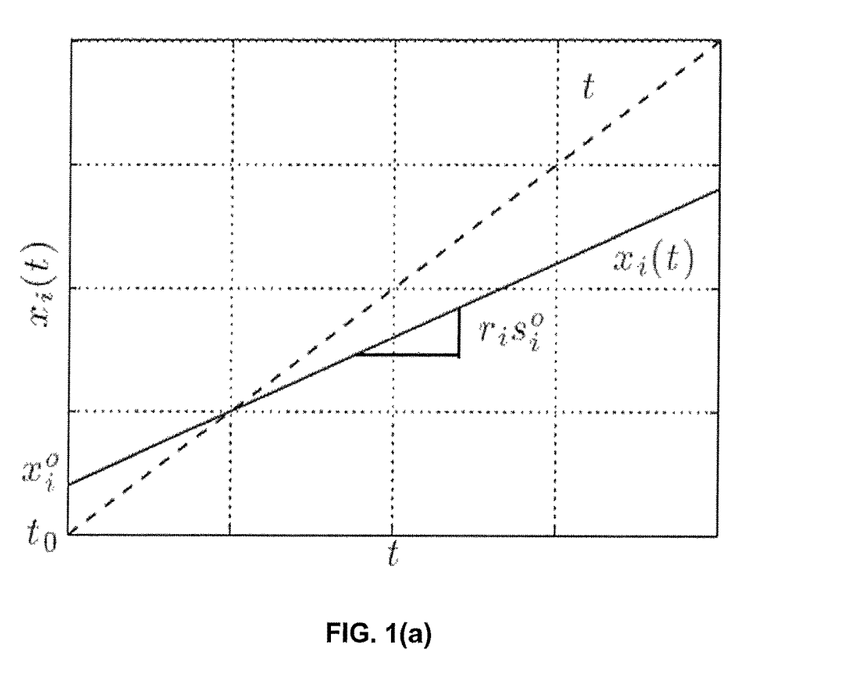
FIG. 1(a) illustrates a graph of computer time estimate $x_i(t)$ and UTC time t according to one embodiment of the invention.

This is illustrated in FIG. 1(a) where $x_i(t)$ not only increases at a different rate than t, but also starts from a value different from $t_0$, represented by $x_i^o$.

In practice, $c_i(t)$ can be approximated by a real value since the time between increments is extremely small (0.416 ns) and the maximum count register value so large ($2^{64}-1$) that it would take more than 200 years to reach. Therefore, $x_i(t)$ can be described by the linear map of the global reference t, i.e.

$$x_i(t) = r_i s_i^o (t - t_0) + x_i^o \qquad \text{Equation (2)}$$

where $s_i^o$ is an additional skew correction implemented to compensate the skew. Equation (2) also shows that if one can set $s_i^o = 1/r_i$ and $x_i^o = t_o$, then a perfectly synchronized clock is obtained with $x_i(t)=t$.

Figure 2A:
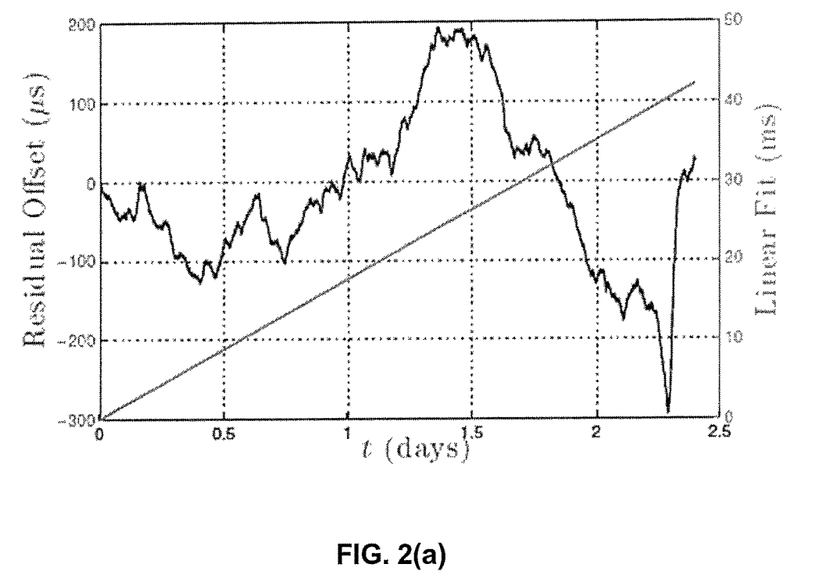
FIG. 2(a) illustrates a graph of variation of the offset between two TSC counters changes on skew $r_i$ according to one embodiment of the invention.

The main problem is that not only neither $t_0$ nor $r_i$ can be explicitly estimated, but also $r_i$ varies with time as shown in FIG. 2(a). Thus, current protocols periodically update $s_i^o$ and $x_i^o$ in order to keep track of the changes of $r_i$. These updates are made using the offset between the current estimate $x_i(t)$ and the global time t, i.e. $D_i^x(t)=t-x_i(x)$, and the relative frequency error that is computed using two offset measurements separated by $\tau$ seconds, i.e.

$$f_i^{err}(t) := \frac{D_i^x(t) - D_i^x(t-\tau)}{x_i(t) - x_i(t-\tau)} = \frac{1 - r_i s_i^o}{r_i s_i^o} \qquad \text{Equation (3)}$$

Figure 1B:
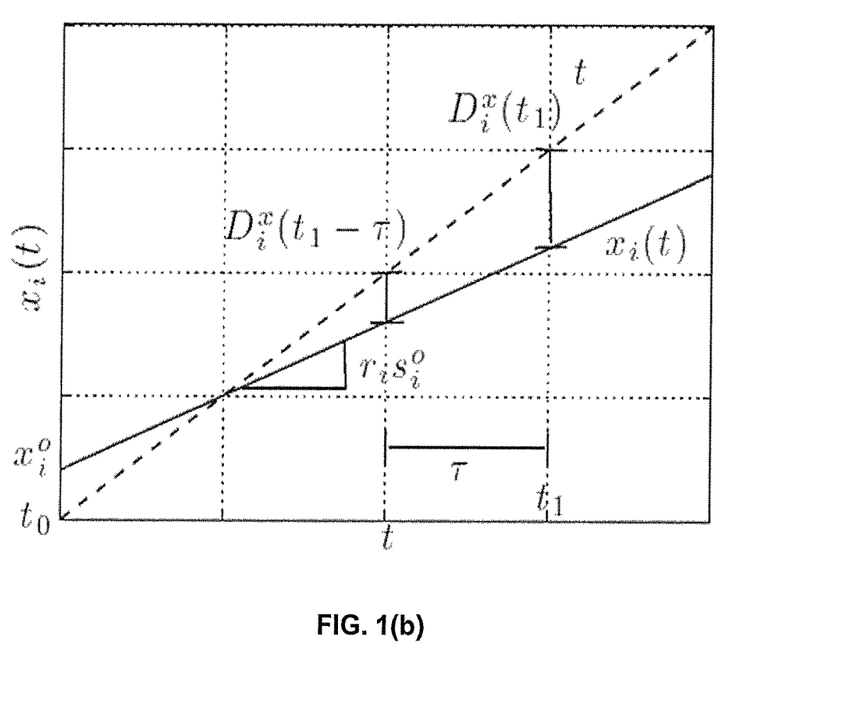
FIG. 1(b) illustrates a graph of offset and relative skew measurements according to one embodiment of the invention.

FIG. 1(b) provides an illustration of these measurements. In most protocols Equation (3) goes through an additional filtering process to reduce the estimation noise. The relative frequency error $f_i^{err}(t_k)$ is used to denote either the measurement obtained using Equation (3) or a filtered version of it.

Figure 2B:
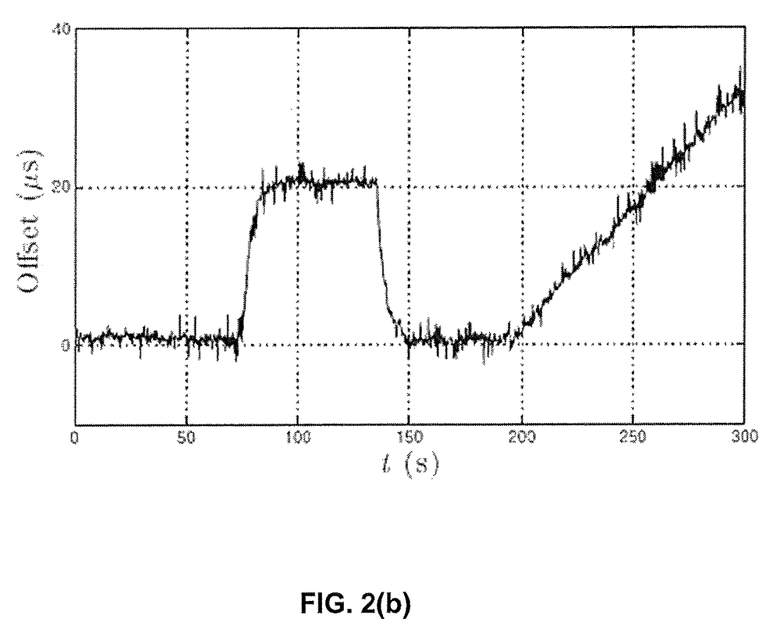
FIG. 2(b) illustrates a graph of skew and offset corrections on linux time according to one embodiment of the invention.

To understand the differences between current protocols, the evolution of $x_i(t)$ based only on the time instants $t_k$ in which the clock corrections are performed. The skew correction $s_i^o$ is allowed to vary over time, i.e., $s_i(t_k)$, and $x_i(t_{k+1})$ is written as a function of $x_i(t_k)$. Therefore, the following is obtained:

$$x_i(t_{k+1}) = x_i(t_k) + \tau r_i s_i(t_k) + u_i^x(t_k) \qquad \text{Equation (4a)}$$

$$s_i(t_{k+1}) = s_i(t_k) + u_i^s(t_k) \qquad \text{Equation (4b)}$$

where $\tau = t_{k+1} - t_k$ is the time elapsed between adaptations—also known as poll interval. The values $u_i^x(t_k)$ and $u_i^s(t_k)$ represent two different types of corrections that a given protocol chooses to do at time $t_k$ and are usually implemented within the interval $(t_k, t_{k+1})$. Offset correction is denoted by $u_i^x(t_k)$ and skew correction is denoted by $u_i^s(t_k)$. FIG. 2(b) illustrates skew and offset corrections on linux time. A 20 μs offset is added and subtracted and then a skew of 0.3 ppm is introduced.

One of the implicit assumptions is that every server—also referred to as node—is required to update their clocks simultaneously at time instances $t_k$ and that each server can connect directly to the source of UTC time t. However, these assumptions are dropped. The main differences between current protocols lies on whether they use offset corrections, skew corrections, or both, and whether they update using offset values $D_i^x(t_k)$, relative frequency errors $f_i^{err}(t_k)$, or both.

Figure 3A:
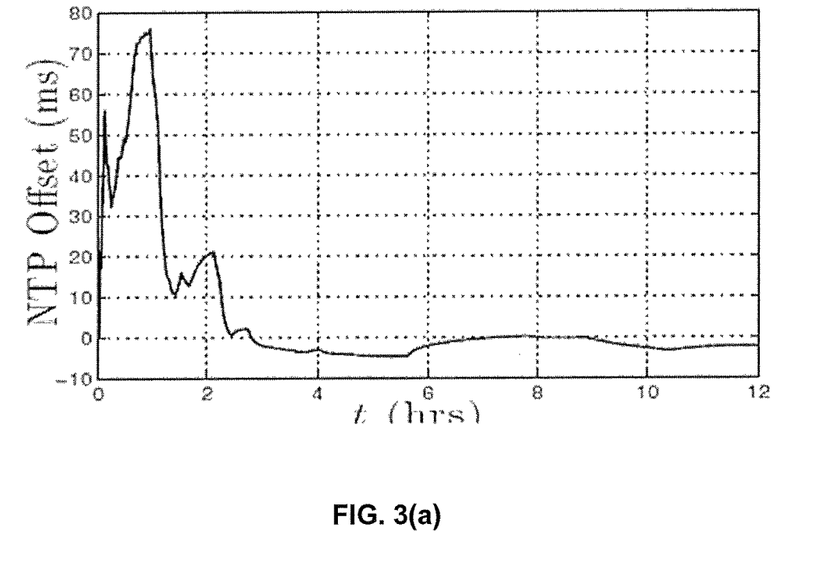
FIG. 3(a) illustrates a graph of the initialization period of NTP according to one embodiment of the invention.
Figure 3B:
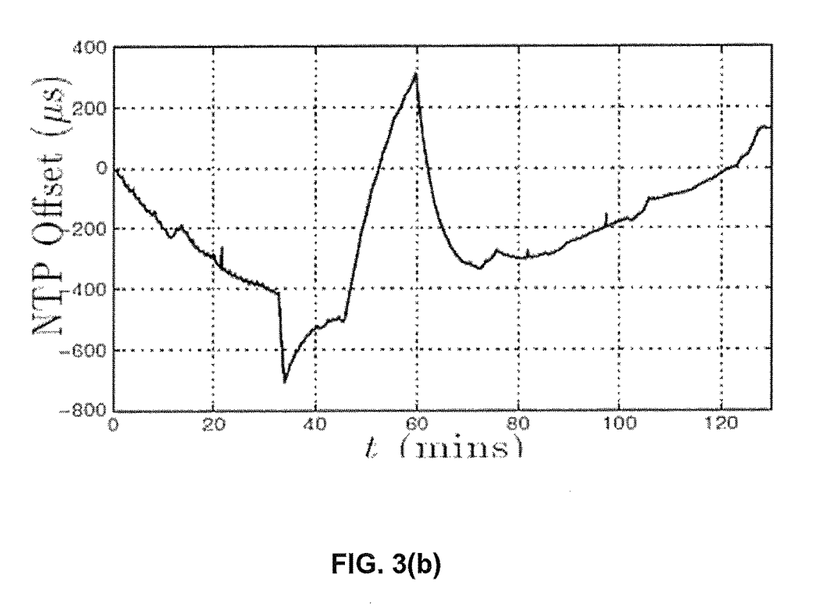
FIG. 3(b) illustrates a graph of the normal regime of NTP according to one embodiment of the invention.
Figure 4A:
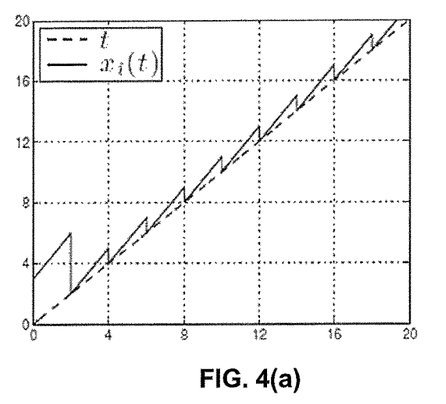
FIG. 4(a) illustrates a graph of offset corrections according to one embodiment of the invention.

Turning to offset corrections, these corrections consist in keeping the skew fixed and periodically introducing time changes of size $u_i^x(t_k) = \kappa_1 D_i^x(t_k)$ or $u_i^x(t_k) = \kappa_1 D_i^x(t_k) + \kappa_2 f_i^{err}(t_k)$ where $\kappa_1, \kappa_2 > 0$. These protocols have in general a slow initialization period as shown in FIG. 3(a). This is because the algorithm must first obtain a very accurate estimate of the initial frequency error $f_i^{err}(t_0)$. Furthermore, these updates usually generate non-smooth time evolutions as seen in FIG. 3(b) and FIG. 4(a), and should be done carefully since they might introduce backward jumps $x_i(t_{k+1}) < x_i(t_k)$, which can be problematic for some applications.

Figure 4B:
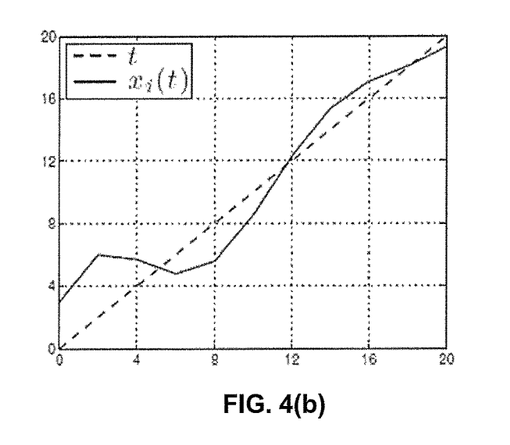
FIG. 4(b) illustrates a graph of skew corrections according to one embodiment of the invention.

Avoiding using steep changes in time, skew corrections without introduction of any offset correction provides $u_i^x(t_k)=0$, and updates the skew $s_i(t_k)$ by $u_i^s(t_k) = \kappa_1 D_i^x(t_k) + \kappa_2 f_i^{err}(t_k)$. The behavior of this algorithm is shown in FIG. 4(b).

Figure 4C:
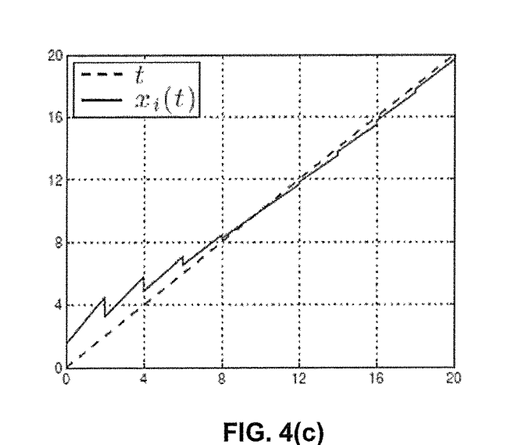
FIG. 4(c) illustrates a graph of offset corrections and skew corrections according to one embodiment of the invention.

With both skew and offset corrections, this type of correction allows dependence on only offset information $D_i^x(t_k)$ as input to $u_i^x(t_k)$ and $u_i^s(t_k)$. For instance, updating $u_i^x(t_k) = \kappa_1 D_i^x(t_k)$ and $u_i^s(t_k) = \kappa_2 D_i^x(t_k)$ allows the system to achieve synchronization without any skew estimation. But the cost of achieving it, is introducing offset corrections in $x_i(t)$ as shown in FIG. 4(c). Another alternative that falls in into this category is the RADclock. In this solution the offset correction $u_i^x(t_k)$ is an exponential average of the past offsets and the skew compensation $u_i^s(t_k)$ is a filtered version of $f_i^{err}(t_k)$. The exponential average of offsets and filter stage in $f_i^{err}(t_k)$ allows this solution to mitigate the jumps and become more robust to jitter. However, it does not necessarily prevent backward jumps unless the offset corrections are smaller than the precision of the clock.

The invention includes an algorithm that overcomes the limitations of previous solutions. Specifically, the algorithm includes the properties of continuity and skew independence. With respect to continuity, the protocol does not introduce steep changes on the time value, i.e. $u_i^x(t_k)=0$. With respect to skew independence, the protocol does not use skew information $f_i^{err}(t_k)$ as input.

A solution with these properties prevents unnecessary offset corrections that produce jitter and are more robust to noise by avoiding skew estimation. The motivation behind the proposed solution comes from trying to compensate the problem that arises when one tries to naively impose properties continuity and skew independence using $$u_i^x(t_k)=0 \text{ and } u_i^s(t_k) = \kappa_1 D_i^x(t_k) \qquad \text{Equation (5)}$$

Figure 5:
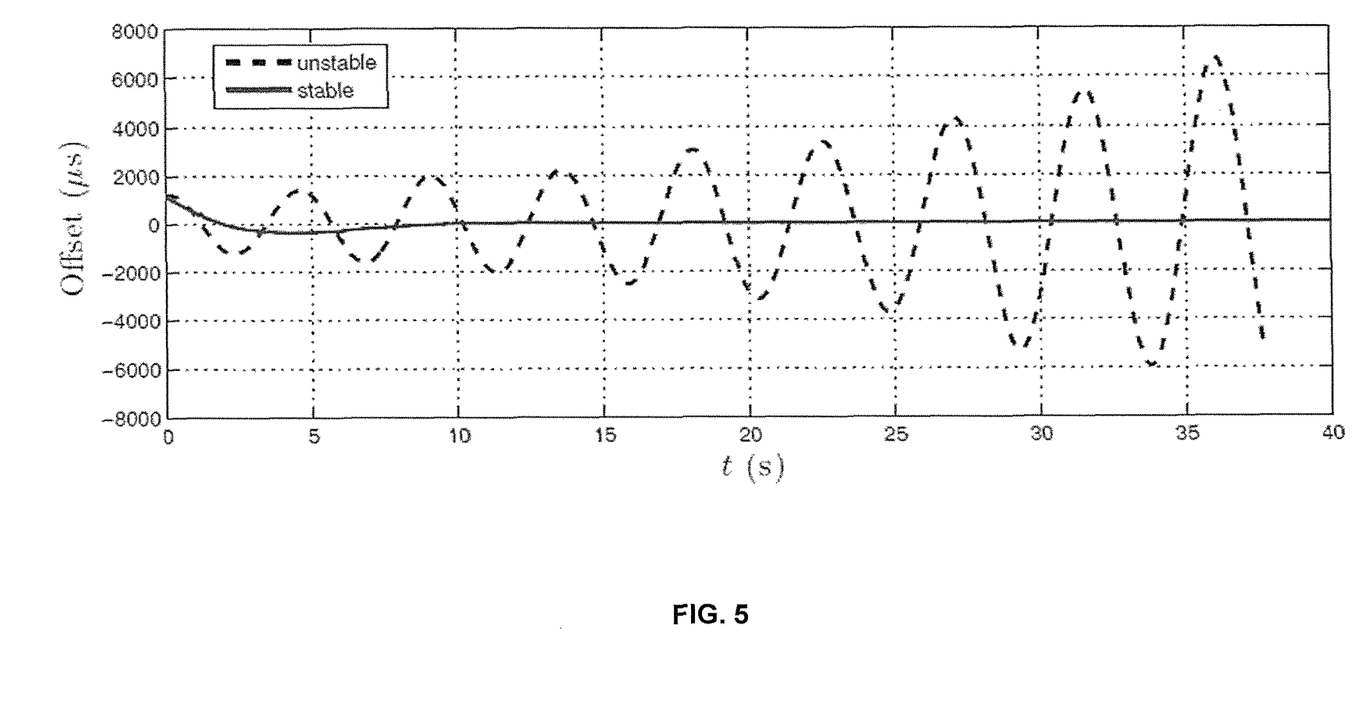
FIG. 5 illustrates a graph of unstable and stable clock steering according to one embodiment of the invention.

FIG. 5 shows that this type of clock correction is unstable—the offset $D_i^x(t_k)$ of the slave clock oscillates with exponentially increasing amplitude. The oscillations in FIG. 5 arise due to the fundamental limitations of using offset to update frequency. Analogizing to a spring mass system without friction, two purely imaginary eigenvalues generate sustained oscillations.

One way to damp these oscillations in the spring-mass case is by adding friction. This implies adding a term that includes a frequency mismatch $f_i^{err}(t)$ in the system, which is equivalent to the protocols discussed above with respect to skew corrections, and therefore undesired.

However, there are other ways to damp these oscillations using passivity-based techniques from control theory. The basic idea is to introduce an additional state $y_i$ that generates the desired friction to damp the oscillations. Thus, the exponentially weighted moving average of the offset is considered:

$$y_i(t_{k+1}) = pD_i^x(t_k) + (1-p)y_i(t_k) \qquad \text{Equation (6)}$$

and $x_i(t_k)$ and $s_i(t_k)$ are updated using:

$$u_i^x(t_k)=0 \text{ and } u_i^s(t_k) = \kappa_1 D_i^x(t_k) - \kappa_2 y(t_k) \qquad \text{Equation (7)}$$

FIG. 5 illustrates how the proposed strategy is able to compensate the oscillations without needing to estimate the value of $f_i^{err}(t_k)$. The stability of the algorithm depends on how $\kappa_1$, $\kappa_2$ and p are chosen.

Finally, the effect of timing loops are reviewed by moving away from the client-server configuration implicitly assumed and mutual or cyclic interactions among nodes is allowed. The interactions between different nodes is described by a graph G(V, E), where V represents the set of n nodes i∈V and E the set of directed edges ij; ij∈E means node i can measure its offset with respect to j, $D_{ij}^x(t_k) = x_j(t_k) - x_i(t_k)$. Within this context, a natural extension of Equation (6) and Equation (7) is to substitute $D_i^x(t_k)$ with the weighted average of the neighbors offsets of i.

Figure 6:
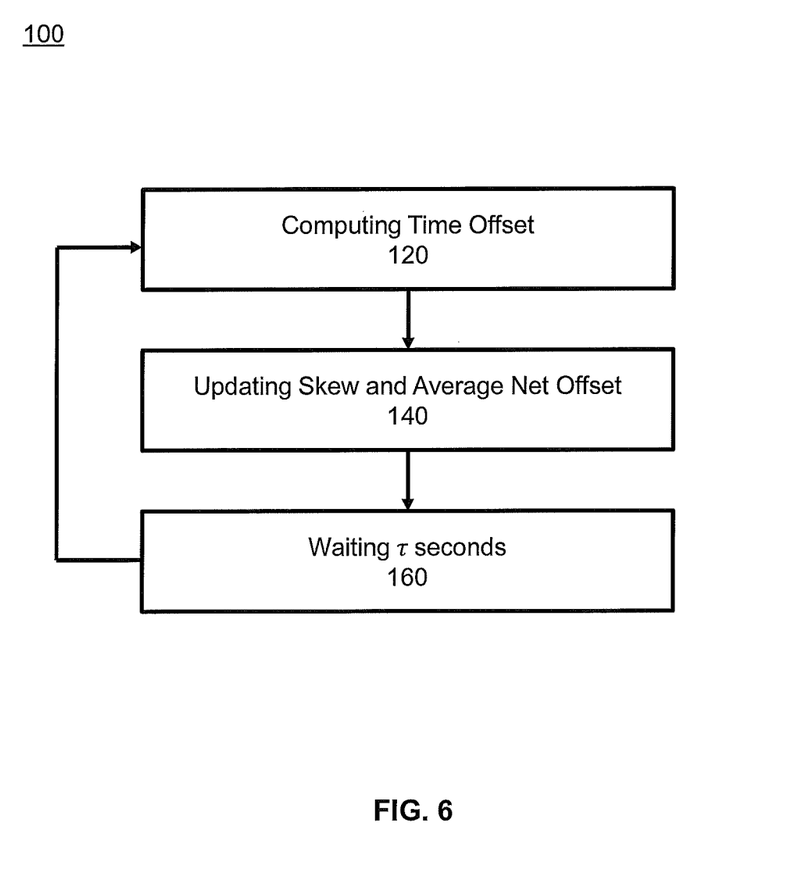
FIG. 6 illustrates a flow chart of the steps of the algorithm according to one embodiment of the invention.

Turning to the algorithm 100 that updates the clocks in the network as shown in FIG. 6, the following actions are performed for each computer node i in the network. In a multinode computer system with each node having a clock, the clocks are synchronized by computing a time offset between clocks of different nodes with all nodes directly connected.

It is assumed that each node or server i can gather information from a set of neighbors $N_i$. As shown by step 120 of FIG. 6, the time offset $D_{ij}^{x}(t_k)$ between servers i and j is computed at time $t_k$. The time offset $D_{ij}^{x}(t_k)$ is measured by node i and represented by $D_{ij}^{x}(t_k)=x_j(t_k)-x_i(t_k)$. The time offset is the difference between a first time estimate of the first clock of the first node at the first specified time and a second time estimate of the second clock of the neighbor node at the first specified time.

A third time estimate of the first clock of the first node at a second specified time is determined as shown by:

$$x_i(t_{k+1})=x_i(t_k)+\tau r_i s_i(t_k) \quad \text{Equation (8a)}$$

According to Equation (8a), $x_i(t_k)$ denotes the time estimate of server i at time $t_k$. The internal skew of each individual clock is denoted by $r_i$, and $s_i(t_k)$ denotes the skew correction at time $t_k$. Thus, given the time estimate at $t_k$, i.e. $x_i(t_k)$, the following time estimate after $\tau$ seconds is obtained using $x_i(t_{k+1})=x_i(t_k)+\tau r_i s_i(t_k)$, where $t_{k+1}=t_k+\tau$. In other words, the time estimate $x_i(t_{k+1})$ includes the first time estimate of the first clock of the first node at the first specified time $x_i(t_k)$, an internal skew of the first clock of the first node $r_i$, a first skew correction of the first clock of the first node at the first specified time $s_i(t_k)$, and the one or more seconds of time $\tau$. The second specified time $t_{k+1}$ is the first specified times $t_k$ in addition to one or more seconds of time $\tau$.

As shown by step 140 of FIG. 6, the skew correction $s_i(t_{k+1})$ and the net estimated time offset, or moving average, $y_i(t_{k+1})$ at time $t_{k+1}$ (after $\tau$ seconds) are updated according to:

$$s_i(t_{k+1}) = s_i(t_k) + \kappa_1 \sum_{j \in N_i} \alpha_{ij} D_{ij}^{x}(t_k) - \kappa_2 y_i(t_k) \quad \text{Equation (8b)}$$

$$y_i(t_{k+1}) = p \sum_{j \in N_i} \alpha_{ij} D_{ij}^{x}(t_k) + (1-p) y_i(t_k) \quad \text{Equation (8c)}$$

The second skew correction $s_i(t_{k+1})$ includes a first skew correction at the first specified time $s_i(t_k)$, a first parameter value $\kappa_1$, a net estimated time offset of the first clock of the first node $$\sum_{j \in N_i} \alpha_{ij} D_{ij}^{x}(t_k),$$

a second parameter value $\kappa_2$, a net offset of the first clock of the first node at the first specified time $y_i(t_k)$. The net estimated time offset from server i is constructed using a weighted average of neighboring offsets, i.e., $$\sum_{j \in N_i} \alpha_{ij} D_{ij}^{x}(t_k).$$

The weighted average is a summation of the time offset between the first clock of the first node and one or more second clocks of one or more neighbor nodes and one or more positive weight values. The positive weights $\alpha_{ij}$ add up to 1, i.e., $\sum_{j \in N_i} \alpha_{ij}=1$.

The second net estimated time offset includes a third parameter value p, a net estimated time offset of the first clock of the first node $$\sum_{j \in N_i} \alpha_{ij} D_{ij}^{x}(t_k),$$

a net offset of the first clock of the first node at the first specified time $y_i(t_k)$. Again, the net estimated time offset from server is constructed using a weighted average of neighboring offsets, i.e., $$\sum_{j \in N_i} \alpha_{ij} D_{ij}^{x}(t_k).$$

The parameter value p is a smoothing parameter greater than the value zero and less than the value two, i.e., $2>p>0$ Equation (8) never stops and runs continuously on every node so that the clocks remain synchronized.

According to the invention, no estimate of skew information between neighboring (interconnected) servers and no direct change on the time $x_i(t_k)$ needed. The invention provides a set of conditions on the parameter values $\kappa_1$, $\kappa_2$, p that guarantee the nodes converge even in the presence of loops in the network.

The convergence property of the algorithm is analyzed to determine the set of parameter values and connectivity patterns under which synchronization is guaranteed. The parameter values that guarantee synchronization depend on the network topology, but there exists a subset of them that is independent of topology and therefore of great practical interest.

Equation (8) may be interpreted as a discrete-time second order consensus algorithm with an additional smoothing in which, besides using position information (time estimates $x_i(t_k)$, a smoothed version of the position errors $y_i(t_k)$ is used to control speed $s_i(t_k)$. The invention also characterizes convergence of discrete-time consensus algorithms. When using the algorithm according to the invention, many servers can affect the final frequency of the system. Thus, when the system synchronizes:

$$x_i(t_k) \rightarrow x^{ref}(t_k):=r^*(t_k-t_0)+x^* i \in V. \quad \text{Equation (9)}$$

$r^*$ and $x^*$ are possibly different from their ideal values 1 and $t_0$. Their final values depend on the initial condition of all different clocks as well as the topology, which may be assumed to be a connected graph.

Advantageously, the invention does not depend on estimated offset error. In addition, weighted offset measurement $y_i(t)$ is used to make skew correction changing $u_i^s(t_k)$. Therefore, neither the measurement itself nor its use is the same. Furthermore, the algorithm only compensates the skew by using the last measured offsets $D_{ij}^{x}(t_k)$ and the filtered offset measurement $y_i(t_k)$. Neither explicit estimation of the skew nor explicit compensation of the offset makes synchronization rather unintuitive.

The effect of noisy measurement and wander is studied together with an optimization procedure that finds optimal parameter values. In the absence of network delays $w_{ij}(t_k)$ and clock wander $d_i(t_k)$, the system achieves synchronization on a wide variety of communication topologies. In other words, the internal clock skew is assumed to be fixed and that each computer could measure its offset with a neighbor without incurring in any error. However, studying the behavior of the system when such assumptions are no longer true, both network delays and clock drifts using noise processes can be modeled.

Since the algorithm according to the invention does not perform skew estimation, the network delay or network errors $w_{ij}(t_k)$ only affect the offset measurements in Equation (8). The error incurred in estimating the offset between nodes i and j at time $t_k$ can be produced for instance by a congested connection between the two different nodes or due to path delay asymmetries. Clock wander $d_i(t_k)$ is modeled as a stochastic input to the clock skew adaptation.

One interesting difference between network delays $w_{ij}(t_k)$ and wander $d_i(t_k)$ is that in order to obtain good performance the algorithm should reject the noise from network delays $w_{ij}(t_k)$, but compensate the skew fast enough to follow $d_i(t_k)$. For arbitrarily distributed noise with stationary mean, the system's frequency tends to constantly drift unless there is a well-defined leader in the topology.

Figure 7:
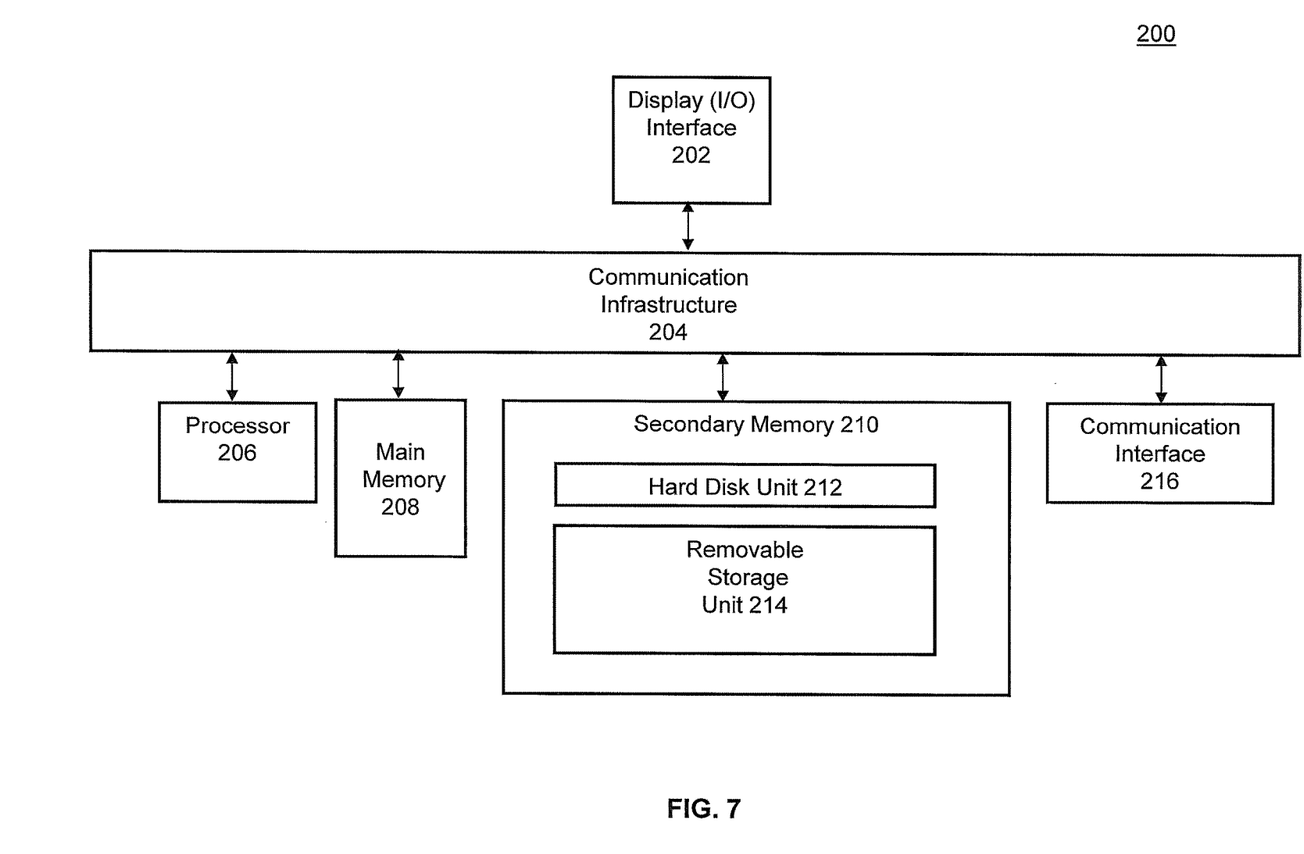
FIG. 7 illustrates an exemplary computer system that may be used to implement the methods according to the invention.

The algorithm may be implemented on any computer system. FIG. 7 illustrates an exemplary computer system 200 that may be used to implement the methods according to the invention. One or more computer systems 200 may carry out the methods presented herein as computer code. In one embodiment, an asynchronous version of the algorithm is programmed in "C" language using a Coordinated Cluster Time (CCT) protocol as code base.

Computer system 200 includes an input/output display interface 202 connected to communication infrastructure 204—such as a bus—, which forwards data such as graphics, text, and information, from the communication infrastructure 204 or from a frame buffer (not shown) to other components of the computer system 200. The input/output display interface 202 may be, for example, a keyboard, touch screen, joystick, trackball, mouse, monitor, speaker, printer, Google Glass® unit, web camera, any other computer peripheral device, or any combination thereof, capable of entering and/or viewing data.

Computer system 200 includes one or more processors 206, which may be a special purpose or a general-purpose digital signal processor configured to process certain information. Computer system 200 also includes a main memory 208, for example random access memory ("RAM"), read-only memory ("ROM"), mass storage device, or any combination thereof. Computer system 200 may also include a secondary memory 210 such as a hard disk unit 212, a removable storage unit 214, or any combination thereof. Computer system 200 may also include a communication interface 216, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc.

It is contemplated that the main memory 208, secondary memory 210, communication interface 216, or a combination thereof, function as a computer usable storage medium, otherwise referred to as a computer readable storage medium, to store and/or access computer software including computer instructions. For example, computer programs or other instructions may be loaded into the computer system 200 such as through a removable storage device, for example, ZIP disks, portable flash drive, optical disk such as a CD or DVD or Blu-ray, Micro-Electro-Mechanical Systems ("MEMS"), nanotechnological apparatus. Specifically, computer software including computer instructions may be transferred from the removable storage unit 214 or hard disc unit 212 to the secondary memory 210 or through the communication infrastructure 204 to the main memory 208 of the computer system 200.

Communication interface 216 allows software, instructions and data to be transferred between the computer system 200 and external devices or external networks. Software, instructions, and/or data transferred by the communication interface 216 are typically in the form of signals that may be electronic, electromagnetic, optical or other signals capable of being sent and received by the communication interface 216. Signals may be sent and received using wire or cable, fiber optics, a phone line, a cellular phone link, a Radio Frequency ("RF") link, wireless link, or other communication channels.

Computer programs, when executed, enable the computer system 200, particularly the processor 206, to implement the methods of the invention according to computer software including instructions. The computer system 200 described herein may perform any one of, or any combination of, the steps of any of the methods presented herein. It is also contemplated that the methods according to the invention may be performed automatically, or may be invoked by some form of manual intervention.

The computer system 200 of FIG. 7 is provided only for purposes of illustration, such that the invention is not limited to this specific embodiment. It is appreciated that a person skilled in the relevant art knows how to program and implement the invention using any computer system.

The computer system 200 may be a handheld device and include any small-sized computer device including, for example, a personal digital assistant ("PDA"), smart handheld computing device, cellular telephone, or a laptop or netbook computer, hand held console or MP3 player, tablet, or similar hand held computer device, such as an iPad®, iPad Touch® or iPhone®.

Running the algorithm, each server issues a thread to handle the connection with each neighbor. Every $\tau$ seconds (using OS time) each client takes offset measurements with its assigned neighbor and reports it to the main thread. Similarly, the main thread wakes up every $\tau$ seconds and gathers the offset information from all the connections and performs the update described in Equation (8). Explicit filtering of offset values are not performed, besides discarding spurious offsets larger than 500 ms in comparison with previous measurement. As an example, an offset change of 500 ms within a $\tau$ of 50 seconds implies a skew of 10,000 ppm.

The Time Stamp Counter (TSC) is read directly using an assembly instruction to minimize reading latencies and maintains a virtual clock that can be directly updated. The list of neighbors is read from a configuration file and whenever there is no neighbor, the program follows the local Linux clock. Finally, offset measurements are taken, for example, using an improved ping pong mechanism.

It is contemplated that the skewless algorithm according to the invention may be run on any node or server. As an example, in one embodiment the skewless protocol is run in a cluster of IBM BladeCenter LS21 servers with two AMD Opteron processors of 2.40 GHz, and 16 GB of memory. A plurality of servers is used to run the protocol with offset measurements taken through a Gigabit Ethernet switch. One server is used as a common reference and runs the same program that implements the algorithm, but without skew adaptations, to measure the offset between itself and the other servers. In this embodiment, these measurements are obtained through a 10 Gbps Cisco 4× InfiniBand Switch to minimize network latencies. Since the offset measurements performed by the common reference server are done at different instances for different servers, linear interpolation is used to compensate this error. To compute the offset between two servers, for example serv1 and serv2 ($x_1(t)-x_2(t)$, ($x_1(t)-x_0(t)$)−($x_2(t)-x_0(t)$)). Spurious measurements are eliminated that generate offsets bigger than 1 ms as these are clearly due to network or OS latencies.

A mean relative deviation $\sqrt{S_n}$ is sued to as a performance metric with a correction to the performance value by the empirical mean deviation to compensate biases due to path asymmetries. In other words, $$S_n = \frac{1}{n-1} \sum_{i=2}^{n} \langle (x_i - x_1 - \langle x_i - x_1 \rangle)^2 \rangle \quad \text{Equation (10)}$$

Default parameters are used with the following values: p=0.99, $\kappa_1$=1.1, $\kappa_2$=1.0 and $$\alpha_{ij} = \frac{c}{|N_i|}.$$

The scalar c is a commit or gain factor that allows compensation for the effect of $\tau$. The condition can be satisfied by modifying $\tau$ or equivalently c. In one embodiment, c=0.7 such that $$\tau < \frac{890.1}{\mu_{max}} \text{ms}.$$

For fixed polling interval $\tau$, the stability of the system depends on the value of $\mu_{max}$, which is determined by the underlying network topology and the values of $E_{ij}$.

Figure 8A:
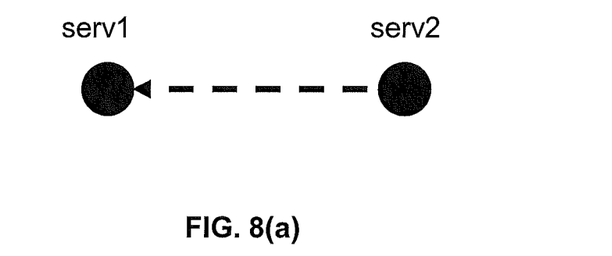
FIG. 8(a) illustrates a client-server configuration topology on convergence according to one embodiment of the invention.
Figure 9A:
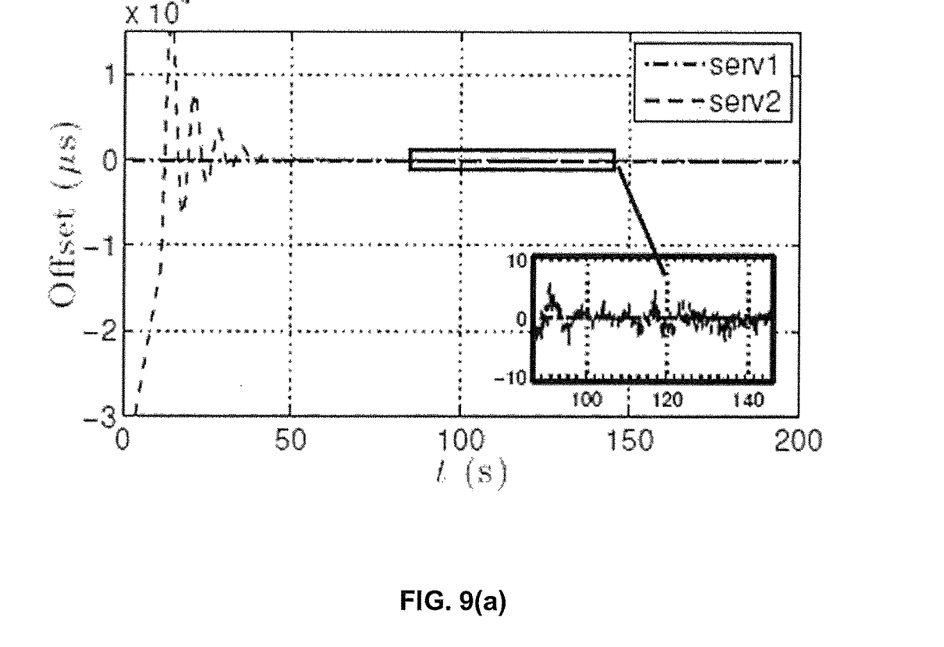
FIG. 9(a) illustrates a graph of algorithm stability with client convergence according to one embodiment of the invention.

Illustrating the effect of different parameters and analyzing the effect of the network configuration on convergence, the client server configuration as shown by FIG. 8(*a*) is considered with a time step $\tau$=1 s. In this configuration, $\mu_{max} \approx$ c=0.7 and $\tau$<1.2717 s. FIG. 9(*a*) illustrates the offset between serv1 (the leader) and serv2 (the client) in microseconds. It can be seen how serv2 gradually updates $s_2(t_k)$ until the offset becomes negligible.

FIG. 9(*a*) suggests that the set of parameters given above and $\tau$=1 s are suitable for deployment on the servers. This is in fact true provided that network is a directed tree such that each client connects only to one server. Thus, those connected to the leader synchronize first and then subsequent layers follow.

Figure 9B:
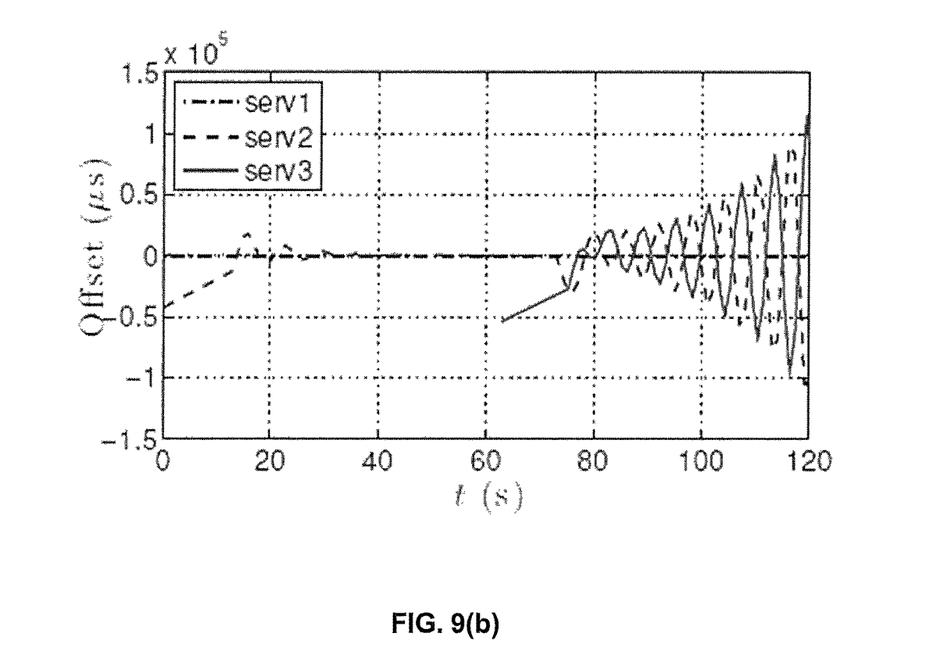
FIG. 9(b) illustrates a graph of algorithm instability without client convergence according to one embodiment of the invention.
Figure 10:
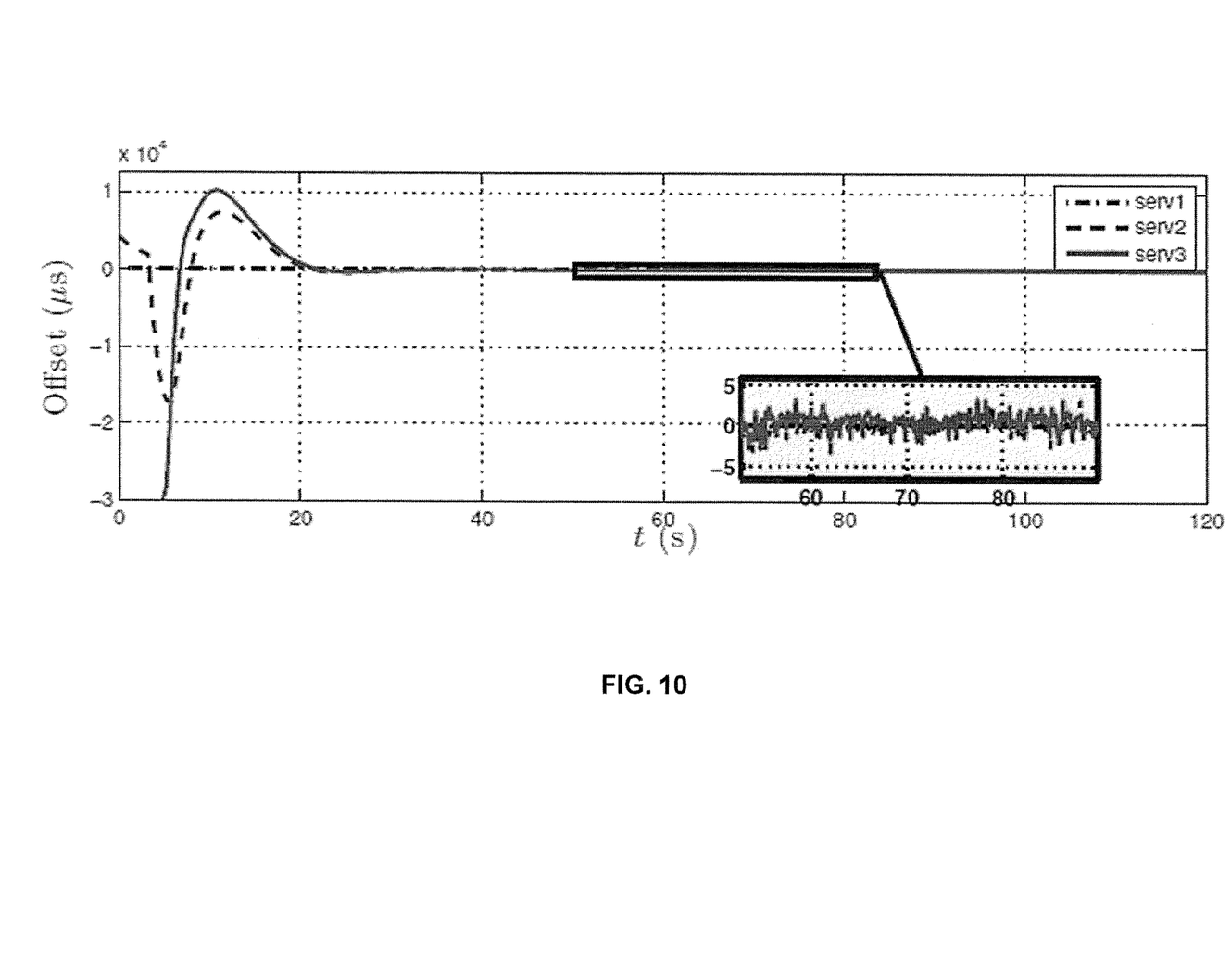
FIG. 10 illustrates a graph of algorithm stability with client convergence according to another embodiment of the invention.

However, once loops appear in the network, there is no longer a clear dependency since two given nodes can mutually get information from each other. This type of dependency might make the algorithm unstable. FIG. 9(*b*) shows serv2 synchronizes with serv1 until a third server (serv3) appears after a period of time, such as FIG. 8(*b*). FIG. 8(*b*) introduces a timing loop between serv2 and serv3. This timing loop makes the system unstable with $\tau$<847.8 ms, which is no longer satisfied by $\tau$=1 s. Thus, this may be solved for the new topology FIG. 8(*b*) by using any $\tau$ smaller than 847.8 ms. FIG. 10 shows how now serv2 and serv3 can synchronize with serv1 after reducing $\tau$ from 1 s to 500 ms.

Now a series of configurations are presented that demonstrate how connectivity between clients is useful in reducing the jitter of a noisy clock source. Timing loops can be used to collectively outperform individual clients when the time source is noisy. Running the algorithm on ten servers with a connection setup as illustrated in FIG. 11.

Figure 11:
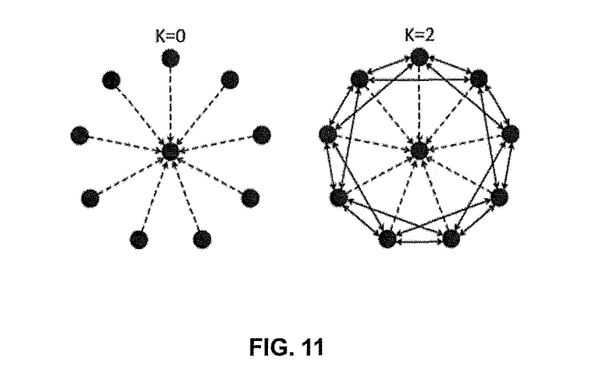
FIG. 11 illustrates a configuration topology with neighbor connections according to one embodiment of the invention.

Specifically, FIG. 11 illustrates unidirectional connections to the leader (serv1) with bidirectional connections among clients. When K=0 then the network reduces to a star topology and when K=4 the servers form a complete graph. The dashed arrows in FIG. 11 show the connections where jitter is introduced. To emulate a link with jitter, random noise $\eta$ is introduced with values taken uniformly on both direction of the communication. The arrow only shows a dependency relationship, the ping pong mechanism sends packets in both direction of the physical communication.

The change on the mean relative deviation $\sqrt{S_n}$ as the connectivity among clients increases shows that even without any offset filtering mechanism the network itself is able to perform a distributed filtering that achieves an improvement equivalent to a noise reduction of almost 8 dB.

Comparing the performance of the invention to a version of NTP (specifically version 4), a one hop configuration is used and both algorithms use the same polling interval. The remainder parameter values were set to p=1.98, $\kappa_1$=1.388, $\kappa_2$=1.374.

In comparison, the invention tracks serv1's clock keeping an offset smaller than 5 μs for most of the time while the version of NTP incurs in larger offsets during the same period of time. This difference is produced by the fact that the algorithm according to the invention is able to react more rapidly to frequency changes while NTP incurs in more offset corrections that generate larger jitter. In addition, the algorithm according to the invention converges to a 20 μs range within one hour while NTP needs approximately 4.5 hours to achieve the same synchronization precision.

The performance of the invention is also compared to CCT. Unlike CCT, the invention does not perform any previous filtering of the offset samples. The filtering is performed instead by calibrating the parameters c=0.70, $\tau$=250 ms, $\kappa_1$=0.1385, $\kappa_2$=0.1363 and p=0.62. The mean relative deviation $\sqrt{S_n}$ for two clients is presented in which the two clients are connected directly to the leader as the jitter is increased with a granularity in the random generator of 1 μs. The invention consistently outperforms CCT in terms of both $\sqrt{S_n}$ in and worst case offset. The performance improvement is due to two reasons. First, the noise filter used by the CCT algorithm is tailored for noise distributions that are mostly concentrated close to zero with sporadic large errors. However, it does not work properly in cases where the distribution is more homogeneous as in this case. Secondly, by choosing $\delta\kappa=\kappa_1-\kappa_2$=0.002<<1, the protocol becomes very robust to offset errors.

It can be verified that without leader, the system tends to constantly drift the frequency. The invention predicts that even the minor bias in the offset measurements produces this effect. To verify this phenomenon, the network topology in FIG. 8(*b*) is used with $\tau$=0.5 s. After 1000 s the timing process of serv1 is turned off and the offsets of serv2 and serv3 start to grow in a parabolic trajectory characteristic of a constant acceleration, i.e. constant drift. After 6600 s, serv1 is restarted and the system quickly recovers synchronization.

Figure 12:
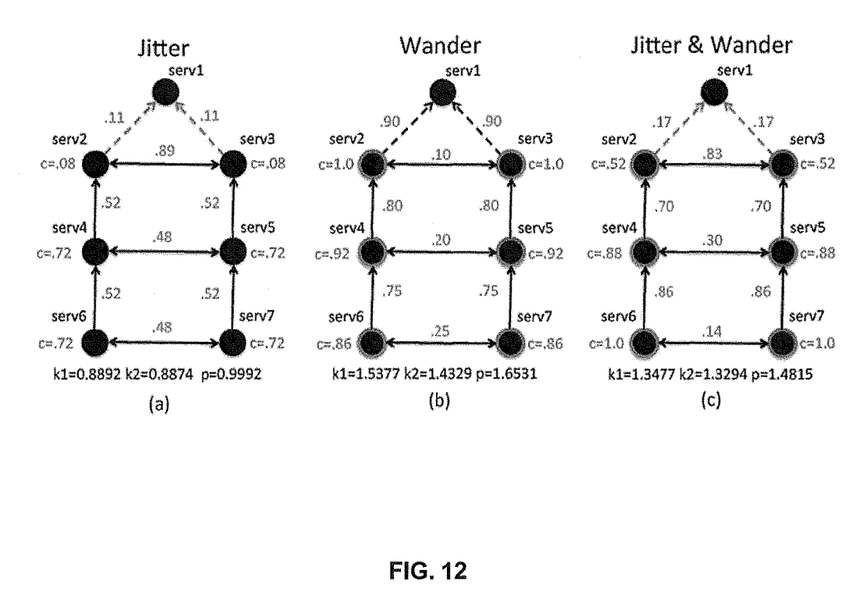
FIG. 12 illustrates network scenarios and optimal parameters according to one embodiment of the invention.

FIG. 12 illustrates network scenarios and optimal parameters according to one embodiment of the invention. Specifically, FIG. 12 illustrates the interplay between network delays, wander and parameter values. Three different noise scenarios are considered in which either jitter is added between servers and/or wander is added on servers. In all the cases, $\tau$=0.5 s and make offset measurements through the InfiniBand switch to minimize the any additional source of noise.

The jitter is generated by adding in both directions of the physical communication a random value $\eta$, but with a maximum jitter of 100 μs. This generates an aggregate offset measurement noise of zero mean and standard deviation of 40.8 μs. On the other hand, the wander is generated by adding gaussian noise with zero mean and standard deviation of 0.2 ppm in the $s_i(t_k)$ adaptations.

Although the configuration tuned for jitter performs very well in cases with large jitter, it performs quite poorly in scenarios with large wander. Similarly, the configuration tuned for wander does not perform well in high jitter scenarios. However, the configuration tuned for jitter and wander is able to provide acceptable performance in all three experimental scenarios. Thus, a fundamental tradeoff between jitter and wander is demonstrated. In addition, the choice of parameters does not degrade the performance of each clock with the hop count.

The clock synchronization protocol according to the invention is able to synchronize networked nodes without explicit estimation of the clock skews and steep corrections on the time. The algorithm is guaranteed to converge even in the presence of timing loops which allow different clients to share timing information and even collectively outperform individual clients when the time source has large jitter. The system is robust to noisy measurements and wander provided that the topology has a well-defined leader, and the parameter values can be optimized to minimize noise variance.

While the disclosure is susceptible to various modifications and alternative forms, specific exemplary embodiments of the invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. In a multinode computer system with each node having a clock, a method of synchronizing two or more clocks on at least two of the nodes, the method comprising:
    computing by a first node at a first specified time a time offset between a first clock of the first node and one or more second clocks of one or more neighbor nodes, wherein the one or more neighbor nodes are directly connected to the first node;
    updating a second skew correction of the first clock of the first node at a second specified time;
    revising a second net estimated time offset of the first clock of the first node at the second specified time; and
    synchronizing the first clock of the first node and the one or more second clocks of the one or more neighbor nodes.

2. The method according to claim 1, wherein the time offset is a difference between a first time estimate of the first clock of the first node at the first specified time and a second time estimate of each of the one or more second clocks of the one or more neighbor nodes at the first specified time.

3. The method according to claim 2, wherein said computing step further comprises the steps of:
    determining a third time estimate of the first clock of the first node at the second specified time, wherein the second specified time is the first specified time in addition to one or more seconds of time.

4. The method according to claim 3, wherein the third time estimate includes the first time estimate of the first clock of the first node at the first specified time, an internal skew of the first clock of the first node, a first skew correction of the first clock of the first node at the first specified time, and the one or more seconds of time.

5. The method according to claim 1, wherein the second skew correction includes a first skew correction at the first specified time, a first parameter value, a net estimated time offset of the first clock of the first node, a second parameter value, a net offset of the first clock of the first node at the first specified time.

6. The method according to claim 5, wherein the net estimated time offset is constructed using a weighted average of the time offset of the one or more second clocks of the one or more neighbor nodes.

7. The method according to claim 6, wherein the weighted average is a summation of the time offset between the first clock of the first node and one or more second clocks of one or more neighbor nodes and one or more positive weight values.

8. The method according to claim 7, wherein the one or more positive weight values equal the number one.

9. The method according to claim 1, wherein the second net estimated time offset includes a third parameter value, a net estimated time offset of the first clock of the first node, a net offset of the first clock of the first node at the first specified time.

10. The method according to claim 9, wherein the net estimated time offset is constructed using a weighted average of the time offset of the one or more second clocks of the one or more neighbor nodes.

11. The method according to claim 10, wherein the weighted average is a summation of the time offset between the first clock of the first node and one or more second clocks of one or more neighbor nodes and one or more positive weight values.

12. The method according to claim 11, wherein the one or more positive weight values equal the value one.

13. The method according to claim 9, wherein the third parameter value is a smoothing parameter greater than the value zero and less than the value two.

14. The method according to claim 1, wherein said updating step and said revising step are performed simultaneously.

* * * * *